Sept. 17, 1935.  W. A. JENNINGS  2,014,969
CONNECTING ROD ALIGNER
Filed March 3, 1933
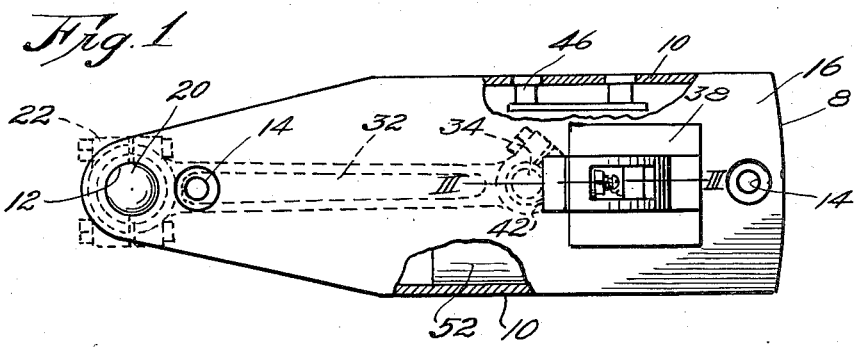
Fig. 1
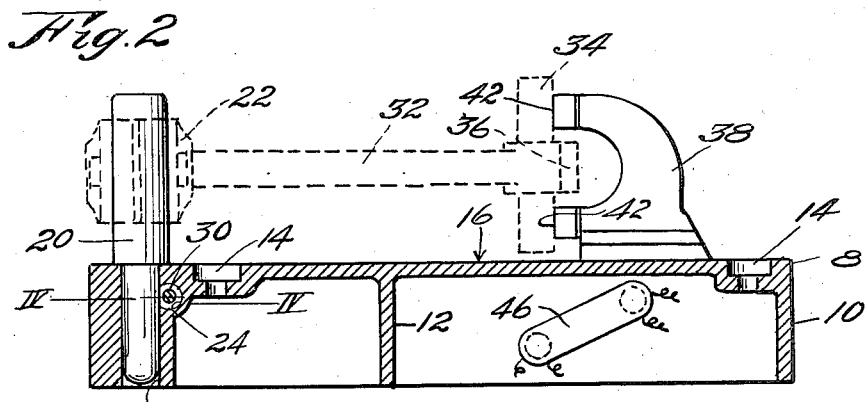
Fig. 2
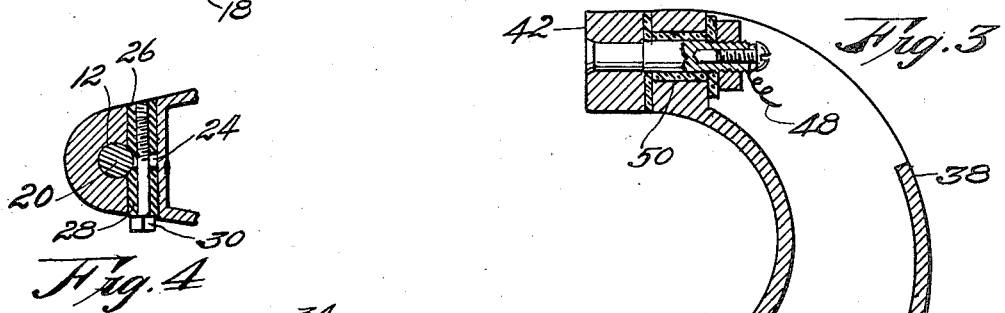
Fig. 3
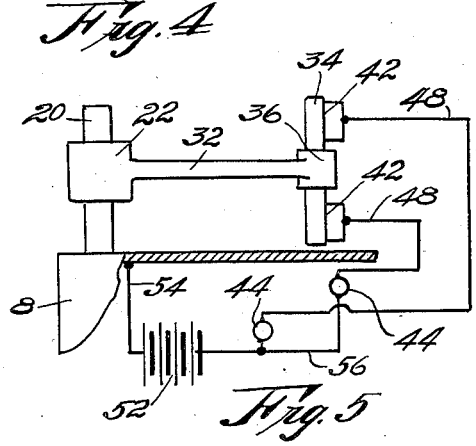
Fig. 4
Fig. 5
INVENTOR.
William A. Jennings.
BY Hovey & Hamilton,
ATTORNEYS Patented Sept. 17, 1935

2,014,969

UNITED STATES PATENT OFFICE 2,014,969

CONNECTING ROD ALIGNER

William A. Jennings, Raytown, Mo.

Application March 3, 1933, Serial No. 659,588

9 Claims. (Cl. 33—180)

This invention relates to equipment employed in aligning connecting rods of internal combustion engines or the like and has for a primary object, the provision of apparatus that is utilized in testing the connecting rod to determine whether or not there is necessity of adjustment to render the longitudinal line of the rod in true perpendicular relation to the axis of the crank shaft bearing thereof.

One of the important aims of this invention is the contemplation of testing apparatus of the character mentioned which incorporates a pair of spaced-apart contact faces, each of which has a signal lamp associated therewith for the purpose of indicating the amount of mal-adjustment which has developed between the main body of the connecting rod and the crank shaft bearing thereof.

A yet further object of this invention is the provision of a unique clamp assembly, whereby one part of the device might be interchanged with others without the use of a large number of complicated structures, which assembly is housed within the body of the apparatus and is quickly adjusted to and from an operative position where the interchangeable member is gripped and held against displacement.

The connecting rod testing apparatus and aligner is specially made to have the parts thereof in a given relation and this relation becomes an important phase of the invention. Such detailed points will be made clear during the course of the specification, referring to the accompanying drawing, wherein:

Figure 1 is a top plan view of a connecting rod aligning device embodying this invention.

Fig. 2 is a longitudinal, vertical, irregular, central section through the same.

Fig. 3 is an enlarged, vertical, central section through the contacting head only, taken on line III—III of Fig. 1.

Fig. 4 is a fragmentary, detailed, sectional view taken on line IV—IV of Fig. 2, and Fig. 5 is a wiring diagram showing the circuit that may be employed in the apparatus.

As heretofore mentioned, it is desirable to determine just how far out of alignment the axis of the connecting rod bearing and the body thereof has become when overhauling internal combustion engines. It is necessary that the connecting rod body be disposed at an accurate right angle to the axis of the crank shaft bearing of the rod and the slightest amount of maladjustment in this regard should be overcome to insure proper action of the engine.

With this idea in mind, it is possible to determine just how to adjust or form a connecting rod body after its condition has been determined through a test given by the machine contemplated.

The aligner is preferably made up to include a base 8 which is cast of metal to have side and end walls 10 and a cross web 12, all for the purpose of precluding warping. Countersunk openings 14 are also formed for the reception of anchoring bolts, not here shown. The face 16 of the top of body 8 must be absolutely planar and is rendered so by milling or planing the casting after it has come from the mold. When this face 16 is formed, a hole 18 is created through body 8 near one end thereof and it is necessary to insure that the axis of this hole be perpendicular to, or at right angles with, face 16.

It is into this hole 18 that pin 20 is moved and, as shown in Fig. 2, this pin 20 is shouldered so that its uppermost end will remain in place to receive the crank shaft bearing of the connecting rod designated by the numeral 22. Since it is sometimes necessary to use pins of various diameters, it is desirable to provide means for clamping any pin in place after the interchange has been made.

A unique and novel clamp assembly, shown in detail in Fig. 4, is, therefore, provided and the same consists of an opening 24 that is formed through base 8 at right angles to hole 18 and at a place where the hole and opening 18 and 24 respectively intersect, as shown in Fig. 4. Within opening 24 is placed the axially aligned tubes 26 and 28, the former being internally threaded, while the latter is not threaded and allows bolt 30 to be freely turned when drawing tubes 26 and 28 toward each other and tightly against pin 20. The adjacent ends of these two coacting tubes are rounded off, or baffled so that a gripping surface is provided that engages pin 20 and when the clamp assembly is in operative position, pin 20 is between the two tubes 26 and 28. Obviously, such a structure precludes rotation of pin 20 and any other movement that might render the device inaccurate.

When testing a connecting rod 32 to determine the necessity of aligning its component parts as hereinbefore mentioned, bearing 22 is moved over pin 20 and a wrist pin 34 positioned in bearing 36 which should also have its axis disposed at an accurate right angle with the longitudinal axis of connecting rod 32. After connecting rod 32 has been so positioned, as clearly shown in Figs. 1 and 2, the unique movable contacting head 38 is brought into play to determine the condition of the rod.

This head is made up of a casting having one face 40 thereof planed smooth so that it will rest upon face 16 and hold contact faces 42 in a plane which is perpendicular to both the plane of side 40 and face 16. Obviously, the plane of contact faces 42 is at right angles to the plane of side 40 of head 38 and this arrangement must be insured when the contacting head is being made.

Contact faces 42 are in spaced-apart relation and held so by a crescent-shaped portion of the head 38 so that pin 34 might be contacted on each side of bearing 36. Each contact face is connected to an electric lamp 44 positioned within a lamp holder 46 that is housed within base 8, and a wire 48 leads from each contact face 42 to the associated lamp 44. Insulating collars 50 preclude grounding or shorting and as the movable contacting head 38 is manipulated to approach pin 34, either one or both of lamps 44 might be caused to burn, all depending upon which contact face actually engages pin 34. If pin 34 is disposed at a very slight angle out of the true vertical or perpendicular, one or the other of faces 42 will strike the same first and the lamp 44 will burn to indicate which end of pin 34 is closer to the face of pin 20. The relation between the face of pin 20 and contact faces 42 must likewise be absolutely a parallel relation, and as the connecting rod is tested it can be bent or sprung to render it true.

In Fig. 5 is shown the manner in which the connecting rod itself becomes a part of the electrical conductors, and since a small battery 52 is carried within base 8, it is obvious that the entire device is self-contained. One side of battery 52 is grounded through wire 54 to base 8, while the other side thereof is connected through wire 56 to lamp 44. From each light 44 wires 48 extend to contact faces 42 and from this point the circuit is completed by way of pin 34, bearing 36, connecting rod 32, bearing 22, pin 20, and base 8.

Movable contacting head 38 rides freely over face 16 and it has been found that micrometer accuracy is present in this machine. Lamp holder 46 projects the rays of light from lamp 44 through small port holes in wall 10 of base 8 and the operator can easily and quickly determine the condition of a connecting rod.

Having thus described the invention, what is claimed as new and desired to be secured by Letters Patent is:

1. A connecting rod aligner comprising a support for such a rod having a member to engage the crank shaft bearing thereof; a head carried by the support for unrestricted movement toward and from another portion of the rod to indicate the relation of said support, rod and member engaging the crank shaft bearing of the latter and electrically operated signals to indicate the angularity of the rod, said signals being in circuits including the connecting rod itself as a part thereof.

2. A connecting rod aligner comprising a base; a pin carried by the base for engaging the crank shaft bearing of a connecting rod; a contacting head supported by the base for unrestricted, free movement toward and from said pin spaced-apart contact faces carried by the head; and electrically operated signals to indicate the angularity of the rod, said signals being in circuits including the said contact faces, said contact faces being insulated from each other and the head.

3. A connecting rod aligner comprising a base; a pin carried by the base for engaging the crank shaft bearing of a connecting rod; a contacting head supported by the base for movement toward and from said pin; a pair of spaced-apart contact faces insulated from each other and from the remaining portion of the head forming a part of said head disposed in a plane parallel to the axis of the said pin throughout the path of travel of the head; and electrically operated signals to indicate the angularity of the wrist pin of said rod, said signals being in circuits including the said pin, base and connecting rod.

4. A connecting rod aligner comprising a base; a pin carried by the base; a contacting head supported by the base for movement toward and from said pin; a pair of spaced-apart contact faces insulated from each other and from the remaining portion of the head forming a part of said head; a signal light connected with each contact face respectively, and a source of electrical energy for the signal light said lights adapted to light when joined to said pin by a connecting rod being aligned.

5. A connecting rod aligner comprising a base; a pin carried by the base; a contacting head supported by the base for movement toward and from said pin; a pair of spaced-apart electrical contact faces insulated from each other and from the remaining portion of the head forming a part of said head; and a signal light connected with each contact face respectively, said lights being housed within the said base and having a source of energy housed within the base whereby the lights are caused to light when joined to said pin by a connecting rod being aligned.

6. A connecting rod aligner comprising a base having a horizontal planar face formed thereon; a vertical pin carried by the base and extending perpendicularly to the planar face; and a head slidably supported for unrestricted movement by the said planar face of the base, said head having a pair of spaced-apart electrical contact faces disposed in a common plane parallel to the axis of said pin and perpendicular to the said planar face of said base, and means for operating an electrical signal when a connecting rod engages either or both of said faces, said faces being insulated from each other and from the head.

7. A connecting rod aligner comprising a base having a planar face formed thereon; a pin carried by the base and extending perpendicularly to the planar face; and a head slidably supported by the said planar face of the base, said head having a pair of spaced-apart electrical contact faces disposed in a common plane parallel to the axis of said pin and perpendicular to the said planar face of said base, said contact faces each having a signal light and a source of electrical energy in a circuit therewith to light the lights when the faces are joined to said pin by the connecting rod being aligned when the latter is made a part of said circuit, said contact faces being insulated from each other and from the said head.

8. A connecting rod aligner comprising a base having a planar, horizontal surface; a vertical pin carried by the base and projecting perpendicularly upwardly from said surface and adapted to engage the crank shaft bearing of a connecting rod; a head having a planar lower face resting upon the planar surface of the base for sliding movement toward and from the wrist pin of the crank shaft; a plurality of contact faces on the head; and an electrical circuit having a signal light therein for each contact face respectively and including the said connecting rod, whereby to indicate by the lighting of the lights the relative angularity of the parts of said connecting rod, said contact faces being insulated from each other and from the head.

9. A connecting rod aligner comprising a base having a planar horizontal face formed thereon; a pin carried by the base at a right angle to the said face; a head resting on the planar face having a pair of spaced-apart contact faces disposed in a common plane at right angles to said planar face when the head is resting on the same; and an electrical circuit for each contact face respectively including an electrically operated signal and a source of electrical energy, said pin adapted to engage the bearing of a crank shaft as said head is moved against the wrist pin of the connecting rod to determine its angularity, either or both of the signals being caused to operate when the wrist pin engages either one or both of said contact faces respectively of the head when it is moved against the wrist pin, said contact faces being insulated from each other and from the rest of the head.

WILLIAM A. JENNINGS.